United States Patent [19]

de Montmollin et al.

[11] 4,210,582
[45] Jul. 1, 1980

[54] WATER-SOLUBLE PYRAZOLONE-IMIDE CONTAINING AZO DYESTUFFS

[75] Inventors: René de Montmollin, Riehen; Hans-Ulrich Schütz, Basel, both of Switzerland

[73] Assignee: Ciba-Geigy Corporation, Ardsley, N.Y.

[21] Appl. No.: 818,682

[22] Filed: Jul. 25, 1977

Related U.S. Application Data

[63] Continuation of Ser. No. 638,776, Dec. 8, 1975, abandoned, which is a continuation of Ser. No. 324,034, Jan. 16, 1973, abandoned.

[30] Foreign Application Priority Data

Jan. 27, 1972 [CH]  Switzerland ........................ 1227/72

[51] Int. Cl.$^2$ ............................................. C09B 29/38
[52] U.S. Cl. ..................................... 260/154; 260/153; 260/162; 260/163; 8/670
[58] Field of Search ................. 260/153, 154, 162, 163

[56] References Cited

U.S. PATENT DOCUMENTS

| 3,126,368 | 3/1964 | Bossard et al. ................... 260/158 X |
| 3,126,370 | 3/1964 | Ruprecht et al. ..................... 260/154 |
| 3,158,596 | 11/1964 | Seitz et al. ............................ 260/163 |
| 3,215,686 | 11/1965 | Zerweck et al. ................. 260/163 X |
| 3,255,173 | 6/1966 | Dehnert et al. ................... 260/154 X |
| 3,316,239 | 4/1967 | Riat et al. ......................... 260/162 X |
| 3,449,317 | 6/1969 | de Montmollin et al. ...... 260/163 X |
| 3,755,290 | 8/1973 | de Montmollin et al. ...... 260/163 X |

FOREIGN PATENT DOCUMENTS 1548143  11/1968  France ..................................... 260/153

Primary Examiner—Arthur P. Demers
Attorney, Agent, or Firm—Michael W. Glynn

[57] ABSTRACT

Monoazo compounds of the formula

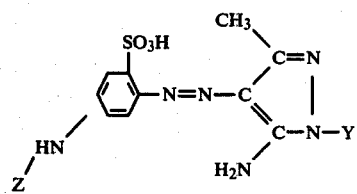

wherein
Y is phenyl, or phenyl substituted by Z—NH—, sulfo, chloro or methyl; and
Z is $\alpha,\beta$-dibromopropionyl or $\alpha$-bromoacryloyl, are excellent dyes and are suitable for dyeing and printing materials of the most diverse kind.

2 Claims, No Drawings

WATER-SOLUBLE PYRAZOLONE-IMIDE CONTAINING AZO DYESTUFFS

This is a continuation of application Ser. No. 638,776 filed Dec. 8, 1975, now abandoned, which in turn was a continuation of application Ser. No. 324,034, filed Jan. 16, 1973 and now abandoned.

The invention relates to monoazo compounds of the formula

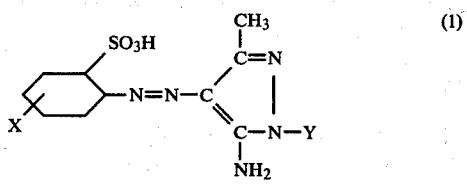

wherein X represents a fibre reactive radical which is bonded to the phenyl radical in meta- or para-position to the azo bridge and Y represents an aryl radical, it being possible for the phenyl radical to contain further substituents.

By fibre reactive radicals are meant those radicals that are capable of reacting with the hydroxyl groups of cellulose or with the amino groups of polyamides to form a covalent chemical bond. Such a radical is, in particular, a low molecular alkanoyl or alkylsulphonyl radical which is substituted by a removable atom of a removable group, a low molecular alkenoyl or alkenesulphonyl radical which is optionally substituted by a removable atom or a removable group, a carbocyclic or heterocyclic radical, containing 4-, 5- or 6-membered rings, which is bonded through a carbonyl or sulphonyl group and is substituted by a removable atom or a removable group, or a triazine or pyrimidine radical which is directly bonded through a carbon atom and is substituted by a removable atom or a removable group, or containing such a radical.

The fibre reactive radicals can be bonded directly to the phenyl radical; but they can also contain a bridge member through which they are bonded to the phenyl radical. As examples of such bridge members there may be cited: —O—, —S—, —CO—, —SO$_2$—, —NH—, —N(alkyl)—, —N(aryl)—, —CONH—, —SO$_2$NH— and —SO$_2$(alkyl)—.

Preferably X is a halogen-containing heterocyclic reactive radical which is bonded through an amino group, such as a halotriazine or halopyrimidine radical, or an aliphatic reactive radical with two or three carbon atoms, such as the chloroacetyl or β-chloropropionyl radical. In particular, X is a radical of the formula —N(R)—Z, wherein R is a low molecular alkyl radical or, preferably, a hydrogen atom, and Z is the α-bromacrylyl radical or the α,β-dibromopropionyl radical. In this context low molecular alkyl radicals are to be understood as meaning alkyl radicals with up to 4 carbon atoms, such as the methyl, ethyl, propyl or butyl radical.

Exemplary of the aryl radical Y is a phenyl or naphthyl radical. These radicals can contain the customary substituents in azo compounds, e.g. halogen atoms, such as chlorine or bromine atoms, low molecular alkyl or alkoxy groups, such as the methyl, ethyl, propyl, butyl, methoxy, ethoxy, propyloxy or isopropyloxy group, acylamino groups, such as the acetylamino or benzoylamino group, alkylsulphonyl or arylsulphonyl groups, such as the methylsulphonyl or phenylsulphonyl group, carboxylic amide or sulphonic amide groups, such as the aminocarbonyl or N,N-dimethylaminosulphonyl group, as well as acid water-solubilising groups, such as the carboxy group or sulphonic acid group. Preferably Y is an arylsulphonic acid radical and, in particular, a phenyl radical. If the aryl radical Y contains an acylamino group as substituent, the acyl radical can also be fibre reactive.

As further substituents which, besides the sulphonic acid group in ortho-position to the azo bridge and the fibre reactive radical X, may be present in the phenyl radical of the monoazo compounds of the formula I, there may be considered the same radicals which have been cited in the exemplification of the aryl radical Y, i.e. halogen atoms, low molecular alkyl or alkoxy group etc., and, in particular, acid water-solubilising groups, such as the carboxy group and, above all, the sulphonic acid group. The phenyl radical can therefore contain optionally more than one sulphonic acid group. Valuable compounds of the formula (1) are those which, besides the fibre reactive radical X, contain in the phenyl radical only one sulphonic acid group, and in the aryl radical Y only one sulphonic acid group and, optionally, one substituent, for example the compounds of the formula

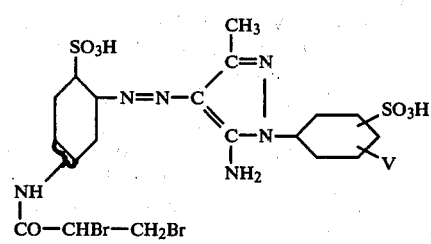

wherein V represents a hydrogen or chlorine atom or a methyl group.

It is possible to manufacture the monoazo compounds of the formula (1) by coupling. The process consits in coupling the diazo compound of an aminobenzenesulphonic acid of the formula

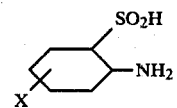

with a 1-aryl-3-methyl-5-aminopyrazole of the formula

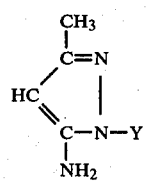

or with the corresponding tautomeric pyrazolone-(5)-imide of the formula

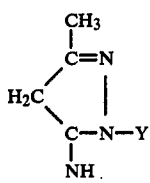

in a manner known per se, preferably at low temperature and in aqueous medium, to give the monoazo compounds of the formula (1). In the formulae (2), (3) and (3a), X and Y have the meanings given in the explanation of the formula (1).

Those compounds wherein X represents an α-bromoacrylamino group can also be manufactured from the corresponding α,β-dibromopropionylaminobenzenesulphonic acid by dehydrobromination.

The diazo components of the formula (2) used as starting materials for the process are manufactured by methods which are known per se, e.g. by the monoacrylation of aminobenzene-2-sulphonic acids which contain in addition a second amino amino group and, optionally, further substituents, with halides or anhydrides of suitable acylating agents which contain a fibre reactive radical, for example one of those cited hereinafter. As aminobenzene-2-sulphonic acids which can be used for the manufacture of diazo components of the formula (2) there may be cited:

1,3-diaminobenzene-6-sulphonic acid,
1,4-diaminobenzene-6-sulphonic acid,
1,3-diamino-4-chlorobenzene-6-sulphonic acid,
1,3-diamino-4-methoxybenzene-6-sulphonic acid,
1,3-diamino-4-methylbenzene-6-sulphonic acid,
1,4-diaminobenzene-2,5-disulphonic acid,
1,4-diaminobemzene-2,6-disulphonic acid,
1,3-diaminobenzene-4,6-disulphonic acid.

Suitable diazo components for coupling with the coupling components of the formula (3) are, for example, diazo compoounds of the following aminobenzene-sulphonic acids:

4-(2',4'-dichloro-1,3,5-triazinyl-(6')-amino)-2-aminobenzene-1-sulphonic acid,
4-(2'-chloro-4'-amino-1,3,5-triazinyl-(6')-amino)-2-aminobenzene-1-sulphonic acid,
5-(2',4',5'-trichloropyrimidyl-(6')-amino)-2-aminobenzene-1-sulphonic acid,
5-(2'-methylsulphonyl-4'-methyl-pyrimidyl-(6')-amino)-2-aminobenzene-1-sulphonic acid,
4-(2',4'-difluoro-5'-chloro-pyridmiyl-(6')-amino)-2-aminobenzene-1-sulphonic acid,
4-(2',2',3',3'-tetrafluorocyclobutyl-(1')-acrylamino)-2-aminobenzene-1-sulphonic acid.
5-(2',2',3',3'-tetrafluorocyclobutyl-(1')-carbonylamino)-2-aminobenzene-1-sulphonic acid,
4- and 5-chloro- or bromoacetylamino-2-aminobenzene-1-sulphonic acid,
4- or 5-acrylamino-2-aminobenzene-1-sulphonic acid,
4- or 5-β-chloro- or β-bromoacrylamino-2-amino-benzene-1-sulphonic acid,
4- or 5-α,β-dichloro- or α,β-dibromoacrylamino-2-aminobenzene-1-sulphonic acid,
4- or 5-β-chloro- or -bromopropionylamino-2-aminobenzene-1-sulphonic acid,
4- or 5-α,β-dichloro- or dibromopropionylamino-2-aminobenzene-1-sulphonic acid,
4- or 5-α-chloro- or -bromoacrylamino-β-aminobenzene-1-sulphonic acid.

These amines can be diazotised by conventional methods, e.g. with sodium nitrite and mineral acid, and the so obtained diazo compounds coupled with the cited coupling components of the formula (3) in neutral to alkaline (e.g. sodium carbonate) aqueous medium.

As acrylating agents which contain a fibre-reactive radical, the following may, for example, be mentioned: chloroacetyl chloride or bromoacetyl chloride, β-chloropropionyl chloride or β-bromopropionyl chloride, α,β-dichloropropionyl chloride or α,β-dibromopropionyl chloride, chloromaleic anhydride, carbyl sulphate, acrylyl chloride, β-chloroacrylyl chloride or β-bromoacrylyl chloride, α-chloroacrylyl chloride or α-bromoacrylyl chloride, α,β-dichloroacrylyl chloride or α,β-dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro-4-chlorobenzene-sulphonic acid chloride or -carboxylic acid chloride, 2,2,3,3-tetrafluorocyclobutane-1-carboxylic acid chloride, β-chloroethylsulphonylendomethylene-cyclohexanecarboxylic acid chloride, acrylylsulphonyl-endomethylene-cyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methyl-pyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloro-pyrimidine, 2,6-bis-methanesulphonylpyridine-4-carboxylic acid chloride, 2,4-dichloro-5-chloromethyl-6-methyl-pyrimidine, 2,4-dibromo-5-bromomethyl-6-methyl-pyrimidine, 2,4dichloro-5-chloromethylpyrimidine, 2,4-dibromo-5-bromomethylpyrimidine, 2,5,6-trichloro-4-methyl-pyrimidine, 2,6-dichloro-4-trichloromethylpyrimidine or especially 2,4-dimethanesulphonyl-5-chloro-6-methylpyrimidine, 2,4-dichloropyrimidine, 3,6-dichloropyridazine, 3,6-dichloropyridazine-5-carboxylic acid chloride, 2,6-dichloro- or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid amide or -sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 2-chlorobenzthiazole-6-sulphonic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trifluoro (-tribromo or -trifluoro)-1,3,5-triazines, as well as 4,6-dichloro (-dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a NH₂ group or by the radical of an aliphatic, heterocyclic or aromatic amine compound bonded via the nitrogen atom. As such compounds, the radicals of which can be bonded to the triazine nucleus in the 2-position by reaction with trihalogenotriazines, the following may for example be mentioned: aliphatic or aromatic mercapto compounds or hydroxyl compounds, such as thioalcohols, thioglycollic acid, thiophenols, alkoxyalkanols, methyl alcohol, ethyl alcohol, isopropyl alcohol, glycollic acid, phenol, chlorophenols or nitrophenols, phenolcarboxylic and phenolsulphonic acids, naphthols, naphtholsulphonic acids and the like, but especially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethanesulphonic acid, but above all aromatic amines, such as aniline, N-methylaniline, toluidines, xylidines, chloroanilines, p- and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline-ω-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid.

The introduction of the substituent which is in the 2-position of the triazine radical can also take place after the condensation with the starting diamine or after the reaction, according to the invention, to give the azo compound of the formula (1).

Apart from the fibre-reactive radicals which can be introduced by acylation, further fibre-reactive radicals which may be mentioned are, for example, the vinylsulphone, β-sulphatoethylsulphone or β-thiosulphatoethylsulphone, β-thiosulphatopropionylamide, β-thiosulphatoethylsulphonylamide, or sulphonic acid-N,β-sulphatoethylamide group, which are introduced into the diazo component in a different manner, for example by ester formation or thioester formation.

As compounds which contain a fibre-reactive radical which cannot be introduced by acylation, and in which the fibre-reactive radical is thus preferably not bonded via an amino group but is directly bonded to the benzene radical, there may be mentioned in particular reactive compounds which can be obtained via corresponding methylols according to Einhorn, for example:
1-amino-3-chloroacetylamino-methyl-4-methylbenzene-6-sulphonic acid or
1-amino-3-chloroacetylamino-methyl-4-methoxybenzene-6-sulphonic acid.

The condensation with the acid halides or anhydrides, or with the heterocyclic halogen compounds, is advantageously carried out in the presence of an acid binding agent, e.g. sodium carbonate or sodium hydroxide, and under such conditions that an unsaturated bond, or a replaceable halogen atom, still remains in the final product.

The coupling components of the formula (3) or (3a) can be obtained in known manner by condensing diacetonitrile or cyanoacetone with an aryl hydrazine.

The following are suitable examples of coupling components of the formula (3a):
1-(2'-chloro-5'-sulphophenyl)-3-methyl-pyrazolone-(5)-imide,
1-(5-sulphophenyl)-3-methyl-pyrazolone-(5)-imide,
1-phenyl-3-methyl-pyrazolone-(5)-imide,
1-(naphthyl-(1))-3-methyl-pyrazolone-(5)-imide,
1-(4'-sulphonaphthyl-(1))-3-methylpyrazolone-(5)-imide,
1-(4'-methoxyphenyl)-3-methyl-pyrazolone-(5)-imide,
1-(3'-α,β-dibromopropionylaminophenyl)-3-methyl-pyrazolone-(5)-imide,
1-(3'-[2'',4''-dichloro-1,3,5-triazinyl-(6)-amino]-phenyl)-3-methyl-pyrazolone-(5)-imide,
1-(b 4'-[2'',4'',5''-trichloropyrimidyl-(6)-amino]-phenyl)-3-methyl-pyrazolone-(5)-imide,
1-(4'-[2'',4''-dichloropyrimidyl-(5)-carbonylamino]-phenyl)-3-methyl-pyrazolone-(5)-imide, methyl-pyrazolone-(5)-imide,
1-(3'-[2'',4''-difluoro-5-chloro-pyrimidyl-(6)-amino]-phenyl)-3-methyl-pyrazolone-(5)-imide.

It is also possible to manufacture compounds of the formula (1) by acylation of azo compunds, which are obtained by methods known in the art, of the formula

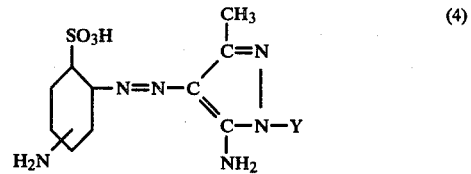

(4)

wherein Y has the same meaning as in formula (1) and the benzene radical can contain further substituents, by means of halides or anhydrides of the acylating agents corresponding to the acyl radicals cited hereinabove, such as aliphatic carboxylic acids, e.g. chloroacetyl or bromoacetyl chloride or bromide, chloroacetic anhydride, acrylyl chloride, β-chloro- or β-bromopropionyl chloride, α,β-dichloro- or dibromopropionyl chloride or bromide, α-chloroacrylyl or α-bromoacrylyl chloride, for example in aqueous medium or in the presence of an acid for binding agent. The compounds of the formula (1) can also be manufactured by diacylation of compounds of the formula

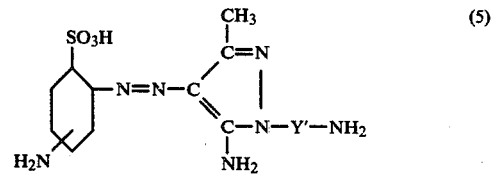

(5)

wherein Y' represents an aryl radical, by means of the cited halides or anhydrides, for example to aqueous sodium, in the presence of an acid binding agent. Furthermore, it is also possible to manufacture the α-bromoacrylyl derivatives of the formula (1) from the corresponding α,β-dibromopropionyl compounds by dehydrobromination. This dehydrohalogenation is performed by methods which are known in the art, e.g. by treatment with alkali, preferably at low temperature.

Since diazo and coupling components can be used which are already acylated to make them fibre reactive, there is the possibility here of obtaining compounds of the formula (1) which contain two different fibre reactive radicals. Since in particular the dehydrobromination described last can also be carried out with alkali before the coupling compounds of the formula (1) for example are obtained, wherein X represents an $\alpha,\beta$-dibromopropionyl radical and the fibre reactive radical contained in Y represents an $\alpha$-bromoarylyl radical, and vice versa.

The compounds of the formula (1) contained by the present invention and the modification thereof are new. They are excellent dyes and are suitable for dyeing and printing materials of the most diverse kind, e.g. those of animal origin, such as leather, silk and, above all, wool, as well as of synthetic fibres, e.g. those made from superpolyamides and superpolyurethanes. They are particularly suitable for dyeing from neutral to acid medium. The dyeings obtained on wool are outstandingly that to light, milling, perspiration and washing.

The new dyes are also suitable for dyeing and printing cellulosic materials such as cotton and regenerated cellulose fibre, in the course of which they are subjected to a heat treatment in the presence of alkali, e.g. in the presence of sodium (hydrogen) carbonate, sodium hydroxide or trisodium phosphate, in order to fix them. In particular they are suitable for dyeing by the cold pad-batch process. Compared with the closest known dyes of the prior art, the dyes obtained according to the invention are distinguished generally improved wet fastness properties, improved resistance to alkali and, in particular, by an improved behaviour in the presence of levelling agents, in particular or polyglycol ether derivatives which contain on average at least the —CH$_2$—CH$_2$—O groups and are derived from primary monoamines, which contain an aliphatic hydrocarbon radical with at least 20 carbon atoms.

If the azo compounds of the formula (1) contain polymerisable radicals as fibre reactive radicals, it is possible with advantage to carry out the dyeing together with a polymerisation catalayst. In this way dyeings are obtained which are distinguished by particularly good wet fastness properties. Polymerisable radicals are in particular those which contain multiple bounds which are capable of addition, chiefly olefinically unsaturated groups which contain at least one C=C double bond. These fibre reactive polymerisable radicals, as mentioned at the outset, can be bonded to the dye radical through various bridge members, e.g. through oxygen atoms or amino groups. The fibre reactive polymerisable radicals are in particular olefinically unsaturated acyl radicals of the acrylic acid, methacrylic acid, crotonic acid and vinylacetic acid series, which are bonded to the dye radical through —NH groups. Preferably the dye contains two or more olefinically unsaturated groups. The fibre reactive polymerisable groups are introduced into the molecule of the azo compound e.g. by acylating corresponding azo compounds, or components thereof, which contain at least one primary or secondary amino group, with acyl compounds which, besides the fibre reactive polymerisable radical, contain a functional group which can be condensed with the primary or secondary amino group. Suitable acyl compounds of this kind are in particular acid halides of acid anhydrides, e.g. crotonyl chloride, acryloyl chloride and methacryloyl chloride.

The dyeing with the use of polymerisation catalysts can be carried out by conventional processes which can be appropriately modified in order to introduce the catalyst. Preferably the substrate is treated with the polymerisation catalyst after the application of the dye, or the polymerisation catalyst is applied simultaneously with the dye below a temperature at which the catalyst is inactive, and then subsequently activated by heating, steaming or some other means Suitable polymerisation catalysts are compounds or compound systems by means of which free radicals can be produced, e.g. organic peroxy compounds, such as peroxides, hydroperoxides, peracids, peresters and percarbonates, as well as inorganic compounds, such as hydrogen peroxide, ammonium persulphate etc.; also redox systems and compounds which are known as initiators for the radical polymerisation of ethylenically unsaturated compounds, such as diazonium compounds and stabilised diazonium salts, cobalt complexes etc. Instead of using a chemical polymerisation catalyst, it is also possible to subject the substrate treated with the dye to the action of ultraviolet, X-, $\gamma$- or electron rays. It is also possible to carry out the dyeing in the presence of further compounds which contain at least one olefinic group which can be polymerised by means of a radical mechanism. Suitable polymerisable monomers are $\alpha$-olefines, aromatic vinyl compounds, e.g. styrene, $\alpha,\beta$-unsaturated acids, for example acrylic acids and methacrylic acids, N-vinyl compounds, unsaturated dicarboxylic acids and dienes. Other suitable monomers are dyes which contain olefinic groups, and compounds which are derived from phenols and aromatic amines and optionally contain water-solubilising groups, e.g. 4-acrylaminobenzoic acid. Polymerisable monomers of this kind can be added to the dyebath or the printing paste together with the dyes and, if required, other substances.

The following Examples illustrate the invention, the parts and percentages being by weight unless otherwise stated.

EXAMPLE 1

402 parts of 4-($\alpha,\beta$-dibromopropionylamino)-1-aminobenzene-2-sulphonic acid are stirred to 5000 parts of water, treated at 5° C. to 10° C. with 600 parts by volume of $\alpha$-naphthalenesulphonic acid (31% parts by volume) and the mixture is diazotised by the dropwise addition of 250 parts by volume of 4 n sodium nitrite solution. To the resulting diazo compound, which is free from nitrous acid, there is passed in a solution of 310 parts of the sodium salt of 1-(2'-chloro-5'-sulphophenyl)-3-methyl-pyrazolone-(5)-imide in 500 parts of water. The pH of the coupling mixture is kept between 4 and 5 by the dropwise addition of about 250 parts by volume of 4 n sodium acetate solution. The coupling is terminated after several hours. The dye is completely precipitated by adding 800 parts of sodium chloride, filtered and washed with 10% sodium chloride solution and dried in vacuo at 70° C. to 80° C.

A yellow powder is obtained which dissolves in water and dyes wool from an acetic acid bath in yellow shades which are very fast to light and wet threatments.

A similar dye which dyes in rather more greenish yellow shades is obtained by using 5-($\alpha,\beta$-dibromopropionylamino)-1-aminobenzene-2-sulphonic acid instead of 4-($\alpha,\beta$-dibromopropionylamino)-1-aminobenzene-2-sulphonic acid.

Similar yellow dyes are obtained by monoacylating the diaminobenzenesulphonic acids listed in the first column of the following Table with the acylating agents listed in the second column, diazotising the resulting products in the conventional manner and coupling them with the pyrazolone imides listed in the third column.

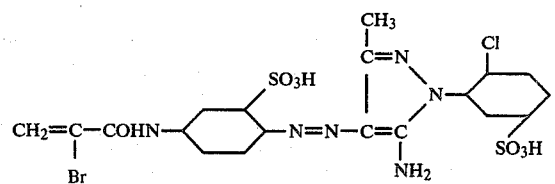

| I | II | III |
|---|---|---|
| 1,4-diaminobenzene-6-sulphonic acid | chloroacetyl chloride | 1-(2'-chloro-5'-sulphophenyl)-3-methylpyrazolone-(5)-imide |
| 1,4-diaminobenzene-6-sulphonic acid | bromoacetyl chloride | 1-(2'-chloro-5'-sulphophenyl)-3-methylpyrazolone-(5)-imide |
| 1,4-diaminobenzene-6-sulphonic acid | acrylic chloride | 1-(2'-chloro-5'-sulphophenyl)-3-methylpyrazolone-(5)-imide |
| 1,4-diaminobenzene-6-sulphonic acid | cyanuric chloride | 1-(2'-chloro-5'-sulphophenyl)-3-methylpyrazolone-(5)-imide |
| 1,4-diaminobenzene-6-sulphonic acid | 2,4-dichloro-6-methoxy-1,3,5-triazine | 1-(4'-sulphophenyl)-3-methyl-pyrazolone-(5)-imide |
| 1,4-diaminobenzene-6-sulphonic acid | 2,4-dichloro-6-methoxyethoxy-1,3,5-triazine | 1-(4'-sulphophenyl)-3-methyl-pyrazolone-(5)-imide |
| 1,3-diaminobenzene-6-sulfonic acid | 2,4-dichloro-6-isopropoxy-1,3,5-triazine | |
| 1,3-diaminobenzene-6-sulfonic acid | 2,4-dichloro-6-(3'-sulphophenylamio)-1,3,5-triazine | 1-phenyl-3-methyl-pyrazolone-(5)-imide |
| 1,3-diaminobenzene-6-sulfonic acid | 2,4-dichloro-6-(4'-sulphophenylamino)-1,3,5-triazine | 1-phenyl-3-methylpyrazolone-(5)-imide |
| 1,3-diaminobenzene-6-sulfonic acid | 2,4-dichloro-6-amino-1,3,5-triazine | 1-(5'-sulphophenyl)-3-methyl pyrazolone-(5)-imide |
| 1,3-diaminobenzene-6-sulfonic acid | 2-methanesulphonyl-4,5-dichloro-6-methyl-pyrimidine | 1-(5'-sulphophenyl)-3-methyl-pyrazolone-(5)-imide |
| 1,4-diaminobenzene-6-sulphonic acid | 2-methanesulphonyl-4-chloro-6-methylpyrimidine | 1-(4'-sulphonaphthyl-(1)-3-methyl-pyrazolone-(5)-imide |
| 1,4-diaminobenzene-6-sulphonic acid | 4,5-dichloro-1-phenyl-pyridazonecarboxylic acid chloride | 1-(4'-sulphonaphthyl-(1)-3-methyl-pyrazolone-(5)-imide |
| 1,4-diaminobenzene-6-sulphonic acid | 4,5-dichloro-1-phenyl-pyridazonecaboxylic acid chloride | 1-(4'-sulphonaphthyl-(1)-3-methyl-pyrazolone-(5)-imide |
| 1,4-diaminobenzene-6-sulphonic acid | β-4,5-dichloro-pyridazonyl-propionic acid chloride | 1-(4'-sulphonaphthyl-(1)-3-methyl-pyrazolone-(5)-imide |
| 1,4-diaminobenzene-6-sulphonic acid | 1,4-dichloroquinoxaline-carboxylic acid chloride | 1-(4'-sulphonaphthyl-(1)-3-methyl-pyrazolone-(5)-imide |
| 1,3-diaminobenzene-6-sulphonic acid | 1,4-dichloroquinoxaline-sulphonic acid chloride | 1-(5'-sulphophenyl)-3-methyl-pyrazolone-(5)-imide |
| 1,3-diaminobenzene-6-sulphonic acid | 2,4,6-trifluoro-5-chloro-pyrimidine | 1-(5'-sulphophenyl)-3-methyl-pyrazolone-(5)-imide |
| 1,3-diaminobenzene-6-sulphonic acid | 2,4,5,6-tetrachloropyrimidine | 1-(5'-sulphophenyl)-3-methyl-pyrazolone-(5)-imide |
| 1,3-diaminobenzene-6-sulphonic acid | 2,4-dichloro-6-(2'-sulphophenylamino)-1,3,5-triazine | 1-(4'-methoxyphenyl)-3-methyl-pyrazolone-(5)-imide |
| 1,3-diaminobenzene-6-sulphonic acid | 2,4-dichloropyrimidine-5-carboxylic acid chloride | 1-(4'-sulphophenyl)-3-methyl-pyrazolone-(5)-imide |
| | 1,4-dichlorophthalazine-6-carboxylic acid chloride | 1-(4'-sulphophenyl)-3-methyl-pyrazolone-(5)-imide |

The same dyes are obtained by monoacylating the diaminobenzenesulphonic acids with non-fibre reactive acylating agents, e.g. acetic anhydride, then coupling, subsequently splitting off the acyl group by saponification, and reacting the subsequently free amino groups in a final step with fibre reactive acylating agents.

EXAMPLE 2

The process as described in Example 1 is carried out, but upon termination of the coupling the dye suspension is adjusted to pH 12 by addition of 10 n sodium hydroxide solution and the temperature is kept at between 10° and 15° by addition of ice. After about 15 minutes the coupling mixture is neutralised with 10 n hydrochloric acid to pH 7, and the dye is precipitated by addition of sodium chloride, filtered, and dried in vacuo at 70° to 80° C.

The dye is obtained in this way, which as free acid corresponds to the formula likewise dyes wool in yellow shades which are fast to light and wet treatments.

Further dyes whish dye wool in yellow shades are obtained according to the directions of Example 1 by coupling the diazo components listed in column I with the coupling components listed in column II.

Instead of the α,β-dibromopropionyl derivatives cited in column I, it is also possible to use the corresponding α-bromacrylyl derivatives by carrying out the process outlined in Example 2.

| I | II |
|---|---|
| 4-(α,β-dibromopropionylamino)-1-aminobenzene-2-sulphonic acid | 1-(5'-sulphophenyl)-3-methyl-pyrazolone-(5)-imide |
| 5-(α,β-dibromopropionylamino)-1-aminobenzene-2-sulphonic acid | 1-(5'-sulphophenyl)-3-methyl-pyrazolone-(5)-imide |
| 4-(α,β-dibromopropionylamino)- | 1-phenyl-3-methyl-pyrazolone- |

| I | II |
|---|---|
| 1-aminobenzene-2,5-disulphonic acid | (5)-imide |
| 5-(α,β-dibromopropionylamino)-4-chloro-1-aminobenzene-2-sulphonic acid | 1-(5'-sulphophenyl)-3-methyl-pyrazolone-(5)-imide |
| 5-(α,β-dibromopropionylamino)-4-chloro-1-aminobenzene-2-sulphonic acid | 1-(2'-chloro-5'-sulphophenyl)-3-methyl-pyrazolone-(5)-imide |
| 5-(α,β-dibromopropionylamio)-4-methyl-1-aminobenzene-2-sulphonic acid | 1-(2'-chloro-5-sulphophenyl)-3-methyl-pyrazolone-(5)-imide |
| 5-(α,β-dibromopropionylamino)-4-chloro-1-aminobenzene-2-sulphonic acid | 1-(5'-sulphophenyl)-3-methyl-pyrazolone-(5)-imide |
| 5-(α,β-dibromoprionylamino)-4-methoxy-1-aminobenzene-sulphonic acid | 1-(5'-sulphophenyl)-3-methylpyrazolone-(5)-imide |
| 4-(α,β-dibromopropionylamino)-5-methoxy-1-aminobenzene-2-sulphonic acid | 1-(2'-chloro-5'-sulphophenyl)-3-methyl-pyrazolone-(5)-imide |

EXAMPLE 3

To a neutral solution of 38.7 parts of the azo compounds of the formula

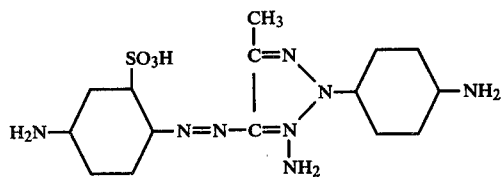

in 1000 parts of water are added dropwise at 0° to 5° C. 60 parts of α,β-dibromopropionyl chloride over the course of 30 minutes, in the course of which the illustrated hydrochloric acid is continuously neutralised with normal sodium carbonate solution.

After a brief time both free amino groups bonded to phenyl radicals are completely acylated. The dyestuff obtained in this manner is precipitated by addition of a small amount of sodium chloride, filtered, and dried at 80° C. to 90° C. It dyes wool from an acetic acid batch in reddish yellow shades which are fast to wet treatments and light.

A similar product is obtained by adjustung the suspension of the dye manufactured as described hereinabove at 10° to 15° C. by addition of 10 n sodium hydroxide solution, neutralising it after about 15 minutes with 10 hydrochloric acid (pH 7), filtering the precipitated dye and drying it at 80° to 90° C. The dye obtained in this manner has the formula

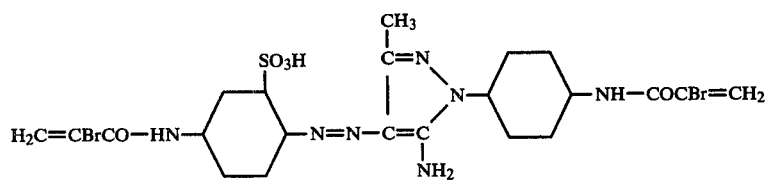

and dyed wool in yellow shades which are fast to wet treatments and light.

DYEING INSTRUCTION 1.5 parts of the dye which can be obtained according to Example 1 is dissolved in water and 4 parts of ammonium sulphate, 5 parts of crystallised sodium sulphate, 1 part of 80% acetic acid and 1 part of the adduct of oleylamine and ethylene oxide (the manufacture of which is described hereinafter) are added. Thoroughly wetted chlorinated wool (100 parts) is put into this dyebath at 30° C. The dyebath is brought to the boil in the course of 30 minutes and dyeing is carried out for 50 minutes at the boil. The bath is then cooled to 80° C. and adjusted to pH 8.5 by addition of ammonia. The wool is dyed in this bath for a further 15 minutes. Finally it is rinsed with cold water and dried. The wool is dyed in yellow shades which are fast to washing and of very good fastness to light.

MANUFACTURE OF THE ETHYLENE OXIDE ADDUCT 100 parts of industrial oleylamine are treated with 1 part of finely divided sodium and the mixture is heated to 140° C., whereupon ethylene oxide is passed in at 135° C. to 140° C. As such as the ethylene oxide has been quickly taken up, the reaction temperature is lowered to 120°–125° C. and the passing in of ethylene oxide is continued until 133 parts thereof have been taken up. The reaction product obtained in this manner is dissolved in water to give a practically clear solution.

We claim:
1. A monoazo dyestuff of the formula

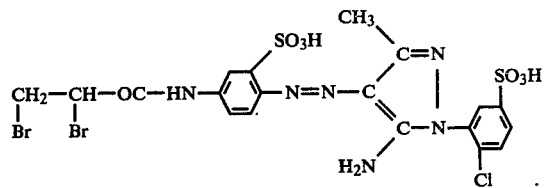

2. A monoazo dyestuff of the formula

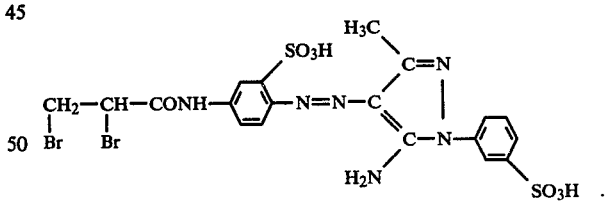

* * * * *